Jan. 3, 1950  M. W. BRAINARD  2,493,102
ROTOR FOR ELECTRIC MACHINES AND
METHOD OF MAKING THE SAME
Filed Dec. 26, 1946  5 Sheets-Sheet 1

INVENTOR
Maurice W. Brainard
BY
ATTORNEY

Jan. 3, 1950          M. W. BRAINARD          2,493,102
        ROTOR FOR ELECTRIC MACHINES AND
            METHOD OF MAKING THE SAME
Filed Dec. 26, 1946                    5 Sheets-Sheet 2

INVENTOR
Maurice W. Brainard
BY
ATTORNEY

Jan. 3, 1950　　　M. W. BRAINARD　　　2,493,102
ROTOR FOR ELECTRIC MACHINES AND
METHOD OF MAKING THE SAME
Filed Dec. 26, 1946　　　　　　　　　　　5 Sheets-Sheet 5

INVENTOR
Maurice W. Brainard
BY
ATTORNEY

Patented Jan. 3, 1950

2,493,102

UNITED STATES PATENT OFFICE 2,493,102

ROTOR FOR ELECTRIC MACHINES AND METHOD OF MAKING THE SAME

Maurice W. Brainard, Los Angeles, Calif., assignor of one-half to O'Keefe and Merritt Company, Los Angeles, Calif., a corporation of California Application December 26, 1946, Serial No. 718,490

15 Claims. (Cl. 171—252)

This invention is concerned with a rotor for electric machines and with a method of making such a rotor it being a general object of the invention to provide various improvements in rotor construction and to provide a simple, practical method of making such construction. The structure of the present invention is applicable, generally, to rotating field type electric machines and is particularly adapted for use in the rotors of generators, motors, or the like, where such machines employ permanent magnets to supply all or part of the required magnetic field.

Rotors of electric machines such as motors and generators may be operated at high speeds and as a result are subject to centrifugal and other forces or strains tending to deform them. It is particularly difficult to obtain proper strength and rigidity in the case of permanent magnet rotors since the magnets may be a large proportion of the total rotating mass and the best magnet material now known is extremely brittle and can not be relied upon to withstand any appreciable tension strain.

It is common in rotors involving permanent magnets to locate the magnets in a casting of nonmagnetic material such as aluminum or aluminum alloys. Such structures are usually only partially successful due to the fact that if the casting is limited to accommodate numbers of large magnets it does not have sufficient strength to withstand the working strains. In practice in machines where permanent magnets are used in the rotors it is important, or at least highly desirable, to operate the rotors in the stators with minimum clearance and therefore slight deformation due to centrifugal force may cause serious trouble.

It is an object of this invention to provide a rotor involving a plurality of permanent magnets incorporated in a unitary structure with pole pieces and non-magnetic links or ties and with a body of cast material so that the various parts are tight or solidly held against shifting and so that the structure as a whole may be operated at high speeds. The structure is such that neither the magnets nor the cast material is relied upon to resist the major radial forces.

Another object of the present invention is to provide a structure of the character referred to in which damper elements or damper bars are effectively incorporated at the periphery of the rotor to protect the permanent magnets against injury in the event of momentary short-circuiting or reversal of current that may occur in the machine and to reduce pole piece heating.

Another object of the present invention is to provide a rotor of the character referred to in which the magnets together with the pole pieces and links are set by means serving to maintain these parts tight independently of the cast body that is combined with them.

Another object of my invention is to provide a construction with a core that expands the magnets into an annular structure or shell formed by the pole pieces and links so that no other parts or means are relied upon to hold the structure tight. The filler or cast body incorporated in the structure is not relied upon to hold the various connected parts tightly together. The cast body is preferably applied while the coupled parts are held with all radial play taken up.

It is another object of the present invention to provide a rotor of the general character referred to in which pole pieces and links are permanently joined into a continuous annular assembly or shell in which the magnets are arranged to bear outwardly.

A further object of the present invention is to provide a rotor of the general character referred to to be coupled with a drive shaft and having a spindle at its outer end carried in a bearing in the outer end of the case of the machine in which the rotor operates.

Another object of the present invention is to provide a method of making a rotor of the general character referred to so that its component parts are easily assembled and are finally incorporated into the finished unit through the application of molten material, while the linked parts are radially expanded.

Another object of the invention is to provide a method of making a rotor which contemplates rotating the whole as the cast body is formed.

The various objects and features of my invention will be fully understood from the following detailed description of typical preferred forms and application of the invention, throughout which description reference is made to the accompanying drawings, in which.

Figure 1:
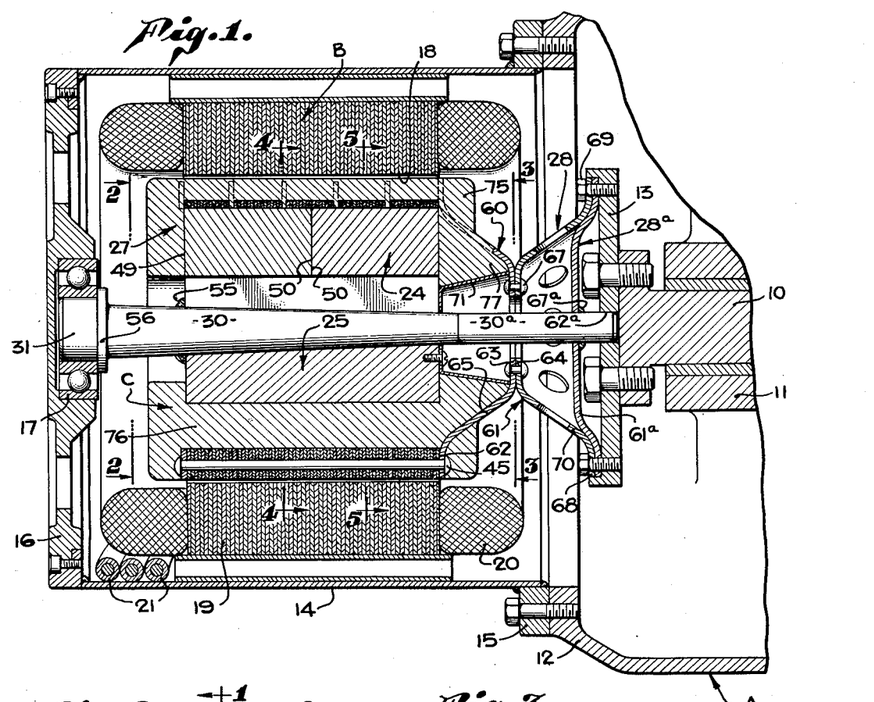
Fig. 1 is a central longitudinal sectional view of a rotary machine in the form of a generator, involving a rotor having permanent magnets embodied therein, which generator is coupled to a prime mover to be operated thereby, the rotor being shown in section as indicated by line 1—1 on Fig. 2.
Figure 2:
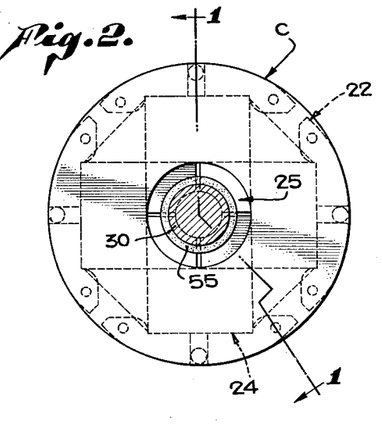
Fig. 2 is a transverse sectional view taken as indicated by line 2—2 on Fig. 1.
Figure 3:
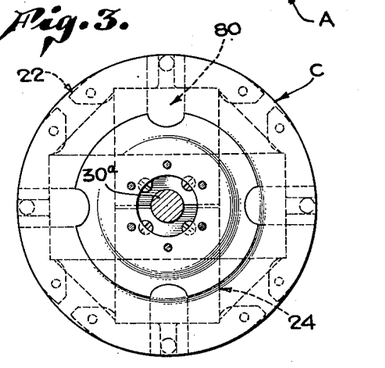
Fig. 3 is a transverse sectional view taken as indicated by line 3—3 on Fig. 1.

My present invention is concerned primarily with a rotor construction, its method of manufacture and its manner of mounting in a machine, and since the invention is particularly applicable to rotors of generators involving permanent magnets I have, in the drawings, illustrated it in such a generator and have shown a typical combination of such a generator with a prime mover or engine. In Fig. 1 of the drawings I show the generator coupled to an engine A to be driven thereby. I show a direct connection between the rotor of the generator and the engine shaft 10, which shaft is supported in a suitable bearing 11 located within an engine casing 12. The rotor is coupled to a driving flange 13 on the engine shaft 10.

The generator, as shown in the drawings, involves generally a case having a cylindrical body 14 coupled to the engine case 12 by a flange 15 and having an outer end 16 closing the outer end of the case and carrying a bearing 17 concentric with the engine shaft 10 to support the outer end of the rotor. The stator B of the generator is fixed in the case of the generator and has a cylindrical opening 18 concentric with the engine shaft 10. The particular stator B illustrated in the drawings involves laminated cores 19 wound with suitable coils 20 connected to the load through suitable lead lines 21.

A rotor C embodying the present invention is located in the stator B to rotate therein with suitable working clearance and is coupled with the engine shaft 10 to be driven or rotated by the engine. The rotor involves, generally, an annular shell or cage formed by an assembly of magnetic pole pieces 22 and non-magnetic couplings or links 23, permanent magnets 24 seated outwardly against the pole pieces 22, expansion means or a core structure 25 bearing outwardly on the magnets 24 to hold them in pressure engagement with the poles 22, a body of non-magnetic material 27 surrounding various other elements of the rotor and filling voids and interstices throughout the rotor, a coupler 28 at what I will term the inner end of the rotor coupling the peripheral portion of the rotor to the prime mover and another or alternate coupler 28ᵃ coupling the center of the rotor to the prime mover.

The core 25 includes generally a plurality of wedges 29 that operate within the magnets 24. The wedges are magnetic and form a core structure to complete the magnetic circuit between adjacent magnets. In the form of the invention illustrated in Figs. 1 to 9, inclusive, the core includes a tapered mandrel 30 that operates the wedges 29 and which carries coupler 28ᵃ. The invention provides a supporting spindle 31 at the outer end of the rotor to be supported in the bearing 17 and in the form of the invention illustrated in Figs. 1 to 9, inclusive, the spindle is formed on or carried by the arbor 30 of the core.

The annular shell or cage of the rotor includes the pole pieces 22 for the magnets, the non-magnetic coupling links 23 and means joining or connecting the pole pieces and the links into a permanent assembly. In the preferred form of the invention this means involves coupling pins 32 extending axially of the rotor through registering openings 33 and 34 in the pole pieces and links, respectively. The shell or cage formed by the pole pieces and coupling links joined by the pins 32 also carries damper members or damper bars 35 extending lengthwise of the rotor through registering openings in the pole pieces.

The rotor involves a plurality of magnets 24 circumferentially spaced around the central axis of the rotor and it has a corresponding number of magnetic pole pieces each of which is shown in Figs. 1 to 11 as a laminated structure involving a plurality of like pole piece laminations formed of magnetic material preferably a suitable sheet steel. The laminations of each pole piece are parallel with each other and extend circumferentially of the rotor in planes normal to the axis thereof and they are arranged side by side to bear one against the other in a compact assembly, except at the points where such assembly is interrupted by the non-magnetic coupling links 23.

Figures 4, 5, 6, 7, 8:
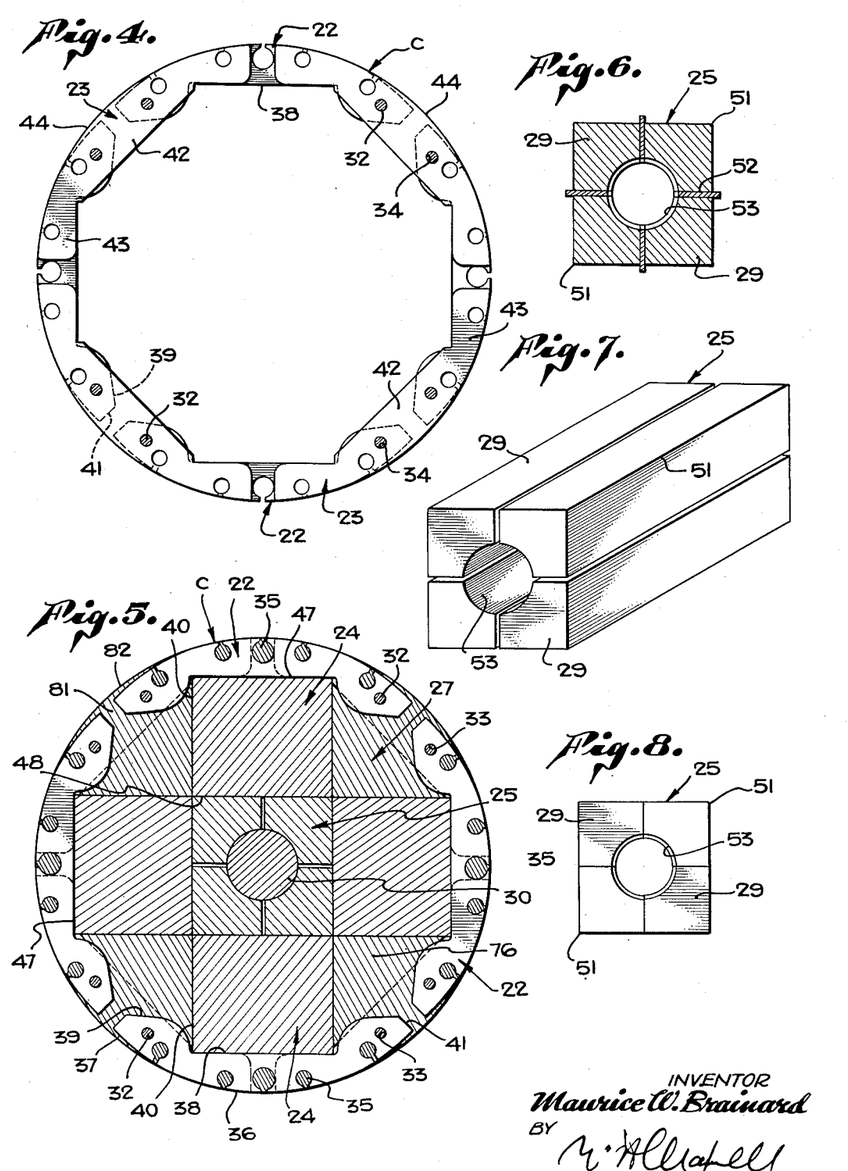
Fig. 4 is an enlarged transverse sectional view taken as indicated by line 4—4 on Fig. 1 showing the annular shell or cage formed by the assembly of pole pieces and coupling links, showing in particular the formation of the plates forming the pole pieces, and showing the assembly of pole pieces and coupling links apart from other elements of the structure.
Fig. 5 is an enlarged detailed transverse sectional view taken as indicated by line 5—5 on Fig. 1, showing the complete rotor.
Fig. 6 is a transverse sectional view of the wedge assembly entering into the core of the rotor showing this assembly in process of manufacture.
Fig. 7 is a perspective view of the wedge assembly of the core, showing it ready for insertion into the rotor.
Fig. 8 is an end view of the wedge assembly showing the several wedges fully collapsed for insertion into the rotor.

Each pole piece has an outer or peripheral edge 36 curved concentrically with the central axis of the rotor except at its extreme end portions 37 where it curves somewhat inward or toward the central axis of the rotor, as clearly illustrated in Fig. 5 of the drawings. The inner edge of each pole piece has a central seat portion 38 against which a magnet 24 bears and it has end portions 39 that extend or return inwardly somewhat to the side walls 40 of the magnet but clear thereof, as shown in Fig. 5, and then extend outward to the ends 41 of the pole piece which may be substantially radial. Through this formation each pole piece is somewhat enlarged at its ends where it is provided with the openings 33 to accommodate the pins 32 and also to accommodate openings for damper bars 35.

Each magnetic pole 22 involving a multiplicity of pole pieces formed as above described is interrupted or divided into sections, say for instance into about five sections, as shown in Fig. 1, by the end portions of coupler links 23 which serve to connect the pole with adjacent poles. The coupler links 23 are formed of non-magnetic material, say for instance, of stainless steel having suitable properties and in practice I prefer to employ only a few coupler links, in which case they are somewhat thicker than the pole piece laminations and are spaced more or less uniformly axially of the rotor. In the particular form of the invention under consideration spacer links are located between the ends of the rotor and also at the inner end of the rotor being part of the coupler 28, as will be hereinafter described.

Each coupler link 23 has a middle portion 42 extending between adjacent magnetic poles and has end portions 43 that fit between adjacent groups of pole pieces where they have openings 34 registering with the openings 33 of the pole pieces to accommodate the pins 32. The end portions 43 of the coupler links are also provided with openings registering with openings in the pole pieces to accommodate damper bars 35. In the particular case illustrated each end portion 43 accommodates two damper bars. The outer edge 44 of each coupler link is curved concentric with the axis of the rotor while the inner edge portion of each coupler link is recessed at the end portions of the link to accommodate the magnets engaging the poles coupled by the link.

The pins 32 that connect the pole pieces and the coupler links extend axially of the rotor through the registering openings 33 and 34 and they are retained in place by heads 45 on their ends. It will be understood, of course, that the pins are headed over so that they serve to connect the pole pieces and coupler plates in a tight body or assembly with adjacent parts bearing tightly one against the other.

The magnets 24 are circumferentially spaced around the central axis of the rotor and they bear inwardly against the seat edges 38 of the pole pieces. In the particular case illustrated in Figs. 1 to 9 of the drawings there are four like magnetic poles spaced 90° apart around the axis of the rotor. Each magnet 24 may be a rectangular block having an outer wall 47 to seat against the seat edges 38, an inner wall 48, side walls 40 and end walls 49. In the particular case illustrated the rotor is of considerable axial extent and each magnet 24 is divided or formed in two sections, as will be seen from Fig. 1 of the drawings. When the magnet 24 is made in two sections the inner ends 50 of each section abut as shown in the drawings. In practice the available bodies of magnetic material may govern whether or not each magnet is made in one piece or is an assembly of pieces. In the preferred formation of parts the several magnets 24 when in seated engagement with their supporting pole pieces 22 define a central polygonal opening in the rotor which opening is such as to receive or to accommodate the assembly of wedges 29.

The core structure that occurs within the rotor involves the wedges 29 which serve to spread or wedge the magnets 24 outwardly so that they are in pressure engagement with the seat edges 38 of the pole pieces. In the particular form of the invention under consideration there are four wedges 29 which when assembled in the rotor form a central longitudinal tapered opening that receives the tapered arbor 30.

In practice the wedges may be varied in number and design and they may be operated in various manners. When the wedges are operated by a central tapered mandrel 30 and when the opening defined by the magnets is polygonal I prefer to employ wedges shaped to fit into the corners of the opening. In the case illustrated in the drawings where there are four magnets 24 defining a rectangular or square opening I employ four wedges 29 each having an outer corner 51 to seat in a corner of the opening defined by the magnets.

The central longitudinal tapered opening defined by the assembly of wedges 29 is such as to receive the tapered arbor so that the arbor can be forced or pressed axially into position where the wedges seat firmly on it and are held tightly out against the inner faces 48 of the magnets causing the magnets to be held tight against the seat edges 38 of the pole pieces. In Figs. 6, 7 and 8 I illustrate the wedge assembly and I illustrate how the wedge assembly can be readily manufactured with the desired tapered opening to receive the mandrel. In Fig. 6 I show a sectional view of the assembly of wedges with the several wedges held apart by shims or spreaders 52. With the wedges thus spaced I form a tapered bore through the assembly to form concave faces 53 in the wedges tapered longitudinally of the wedges. When the faces 53 have been formed the shims 52 are removed and the several wedges may be collapsed or moved together into contracted assembly as shown in Fig. 8 to facilitate introduction of the wedge assembly into the rotor when the magnets 24 are in place.

Once the assembly of wedges has been introduced between the magnets 24 the arbor can be forced longitudinally into or through the wedge assembly until the wedges have been spread to force the magnets 24 outwardly into the desired pressure engagement with the edges 38. The taper of the arbor 30 is such that friction effectively holds the arbor in the desired seating position. However, I prefer to provide positive means for anchoring the arbor in place, for instance, I may fasten the arbor to the wedges as by welding 55.

The large end of the arbor 30 projects a substantial distance from the assembly of wedges, magnets and the other parts above described, and the spindle part 31 may be in the nature of an enlargement on the projecting end of the arbor. In the preferred construction the large end of the arbor is provided with a head or enlargement defining a flange 56 with the spindle part 31 outward of the flange. The flange engages the bearing 17 while the spindle 31 fits into the bearing.

The coupler 28 provided at the inner end of the rotor may vary widely in form and construction since it is intended primarily as a means for connecting the rotor construction with an operating shaft 10 or the like. In the preferred construction the coupler involves an anchor section 60 joined to the shell formed by the assembly of pole pieces and coupler links and a coupling section 61 that connects with the flange 13 on the shaft 10. The anchor section 60 as shown in the drawings involves an outer flange 62 held tight against the annular shell or cage by the heads 45 on the pins 32 located at the inner end of the rotor. The anchor section has an inner flange 63 joined to a corresponding inner flange 64 on the coupler section 61. The flanges 62 and 63 are joined by a conical hub or web portion 65 which projects inwardly and axially from the outer flange 62 to support the flange 63 at a point axially removed from the magnets 24 in the direction of the engine to which the rotor is connected.

The coupling section of the coupling 28 has the inner flange 64 joined to the flange 63 as by rivets 67 or the like, and it has an outer flange 68 secured to the engine flange 13 by suitable fastening devices such as screw fasteners 69. The section 61 has a conical hub portion 70 similar to the hub portion 65 but oppositely disposed, as clearly illustrated in Fig. 1 of the drawings. The coupler 28ª may be used with coupler 28 to supplement it or it may be used when coupler 28 is not present.

In the drawings I show coupler 28ª as including a section 61ª similar to section 61 described above and such that it may be secured to the engine after the manner that section 61 is secured to the engine. If both coupler are used the sections 61 and 61ª may be arrayed one over the other. The arbor 30 has an extension 30ª forming a section of the coupler 28. The arbor extension may be suitably joined to the section 61ª. I have shown these parts joined by welding 67ª and I show the outer end of the arbor extension guided and centered in an opening 62ª in engine flange 13.

In the preferred form of the invention a cup-like retainer 71 is arranged within the hub portion 65 of the coupler section 60 to extend from the wedges 29 to a point in the vicinity of the flange 63. The cup is provided to form a chamber within the hub 65 to be filled with material as the body 27 is formed. The body 27 of the rotor C is a filler or casting of non-magnetic material such as aluminum or an aluminum alloy and it is formed or cast onto the structure hereinabove described to fill various voids or interstices that would otherwise be left unoccupied and to be integrally bonded to elements such as the damper bars 35. The body 27 is so supplied to the other parts of the rotor as to be a solid continuous bonding element of such character and form as to positively and tightly bond the various other parts of the rotor into a unit entirely free of play or relatively working parts. Since the body 27 is applied to the other parts of the rotor by casting and is so applied as to completely fill or occupy all voids and interstices I will not attempt to describe in detail all parts of the body, but will refer only to the principal parts thereof.

The body in its finished form has end flanges 75 occurring at the ends of the rotor overlying the ends of the shell or cage, the magnets and the wedges. Longitudinal rib parts 76 of substantial size extend between the flanges 75 between the magnets 24 and within the shell or cage. The damper bars 35 are preferably part of or integral with the body and extend between the flange 75 through the openings provided in the shell or cage for this purpose. At the inner end of the rotor the body 27 has a portion 77 that fills the space between the cup 71 and the hub 65 and it is preferred that the part 77 of the body be joined with the flange 75 at the inner end of the body by coupling webs which occupy radial notches or openings 80 formed in the anchor section 60 of the coupler 28. Fin portions 81 of the body project radially from the rib parts 76 between the ends of the pole pieces of adjacent poles 22 and the fins 81 have circumferential extensions 82 which overlie the inwardly turned end portions of the pole pieces as clearly illustrated in Fig. 5 of the drawings.

In accordance with the method that I have provided the various elements of the rotor except for the body 27 are initially assembled into the general relationship in which they finally occur in the rotor, are (with the exception of the arbor 30) fixed together in this relationship and are stressed or put under strain to eliminate all radial looseness. From the foregoing description it will be apparent how the several parts entering into the shell or cage can be readily assembled with the coupler section 28 attached thereto and how these parts can be fixed in the assembled form by the application of the pins 32. With the shell assembled the magnets 24 are arranged within it opposite the seats of the magnetic poles whereupon the assembly of wedges 29 is introduced between the magnets. The arbor 30 is then applied forcing the magnets 24 outwardly into pressure engagement with the seats of the pole pieces, thus tensioning the assembly so that radial pressure is exerted outwardly on the several magnets holding them tight against the seats of the pole pieces and causing an expansive pressure to be established in the shell or cage with the result that the numerous parts entering into the assembly are set so the structure is free of play or possible movement between elements.

Figure 9:
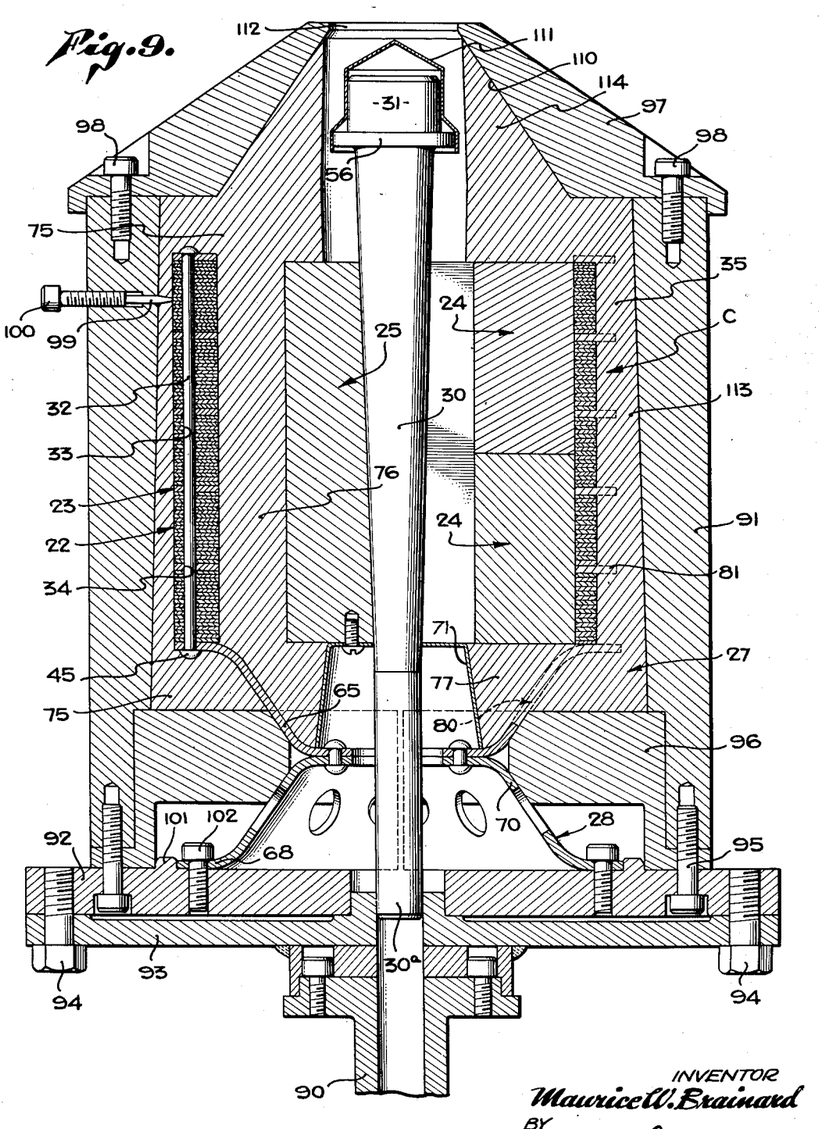
Fig. 9 is a vertical central view of the rotor showing it mounted in a rotating mold used in applying the cast filler or body to the other parts of the rotor, the core of the rotor being shown as it is in Fig. 1 of the drawings.

The assembly that I have just described, which is the rotor less the body 27 and the damper bars which are integral with the body and therefore, in effect, part of it, is then placed in a mold. The mold is such as to facilitate the casting or forming of the body 27 and, in practice, it may be varied considerably in form and design, although it is preferred that it be a revolving mold and it is preferably revolved on a vertical axis. In the drawings I have illustrated a vertically disposed mold on a vertical drive shaft 90 and the mold involves, generally a cylindrical body 91 projecting upwardly from a bottom or base plate 92. The base plate 92 is coupled to a flange 93 on the shaft 90 by screw fasteners 94, and the body of mold is coupled to the base plate by screw fasteners 95. A false bottom 96 is carried in the body 95 and is split diametrically into sections that are assembled around the coupling 28 of the rotor. A cap 97 is applied to the upper end of the body 91 and is secured thereto by screw fasteners 98. In practice I provide a plurality of spacer pins 99 carried by screw 100 so that they can be operated to project radially into the body 91 to centralize the rotor shell in the body.

The rotor assembly less the body 27 is arranged within the mold with the coupler 28 down or in the bottom of the mold. The flange 68 of the coupler is guided by a rib 101 on the base plate 92 so that it is centralized in the mold and it may be attached to the base plate by screw fasteners 102. The sectional false bottom 96 is applied to the coupler 28 to seat in the V-shaped annular channel formed by the opposed conical hub portions 65 and 70. The false bottom projects outwardly from the coupler 28 to the inner wall of the mold body 91. With the false bottom applied to the coupler 28 the body 91 is arranged in place around the false bottom and the body 91 with the false bottom located therein is made fast to the base plate 92 by the fasteners 95. The base plate is then made fast to the shaft flange 93 by the fasteners 94.

With the parts assembled as just described the rotor assembly less the body is located within the mold body 91 with the shell projecting upwardly therein. The spacer pins 99 are adjusted to centrally locate the shell in the mold body. The projecting end portion of the arbor extends upwardly somewhat above the mold body 91 to enter a central opening 110 in the top or cap 97 of the mold. In practice I prefer to provide a protective cover 111 over the upper end portion of the arbor 30 to protect the spindle and flange located thereon. The cap or cover 97 of the mold has a central opening 112 in its upper end.

With the various parts of the mold fully assembled with the rotor parts therein less the body 27, this assembly is preheated or brought to a temperature of about 1000° F. The arbor 30 is then further forced between the wedges to take up any slack or looseness that may result from expansion due to heat. The fastening means 55 may be then applied or it may be applied after the parts are removed from the mold. The mold is then rotated at a suitable speed, say for instance about 1000 revolutions per minute, and then molten metal to form the body 27 is introduced into the mold through the opening 112 in the cap 97. The molten metal flows by gravity and centrifugal force downward and outward in the mold filling the mold above the false bottom 96 and filling the various voids and interstices in the mold above the false bottom 96 and throughout the rotor parts located in the mold. In the preferred manner of forming the body 27 the mold 91 is made somewhat larger than the finished rotor so that as the body 27 is cast an excess body wall 113 surrounds the shell of the rotor and some excess metal is formed or cast at the ends of the rotor where the flanges 75 occur. As the casting operation occurs the various parts of the body 27 are formed and the damper bars are cast in the shell or cage so that they are integral with the various other parts of the body. It will be apparent that the body 27 being cast while the entire structure is spun, a dense casting is gained and all air that might otherwise be trapped in the rotor by reason of the intricate formation thereof is excluded or driven out so that the body is a dense, uniform casting free of voids or blowholes.

When the casting operation has been completed the various parts of the mold are separated allowing the casting to be removed, it being preferred that the interior of the body 91 be slightly tapered to facilitate ejection of the casting therefrom. It will also be noted that the opening 110 in the cap 97 is made fairly large and upwardly tapered so that a portion of the casting in the nature of a riser 114 may be formed therein.

When the casting has been removed from the mold the flange 68 of the coupler 28 is free to be attached to a lathe or other suitable machine and a center or part of a machine may be attached to the spindle 31 after the protective cap 111 has been removed. With the casting properly located in a machine such as a lathe excess parts of the casting are turned away or removed, for instance, the excess outer body portion 113 is turned away leaving the edge portions 36 and 44 of the pole pieces and coupler links exposed. Further, the end portions of the casting are turned to remove the projecting riser 114 and the ends are finished or dressed to form the flanges 75 so that they are of the desired size and shape, as shown in Fig. 1 of the drawings. If the arbor fastening means 55 has not been applied it may now be applied to insure that the arbor can not work loose.

From the foregoing description it will be apparent how I provided a rotor involving an assembly of numerous parts all permanently joined and bonded so that rotor can be operated at a very high speed without danger of distortion. The initial radial pressure applied to the rotor parts before the body is formed eliminates any looseness that might allow parts to move outward when the rotor is in operation and as the entire assembly, including the cast body 27, cools the expanded parts including the body tend to contract or shrink and thus exert an inward binding action to the end that the total structure is solid and firm.

Figure 10:
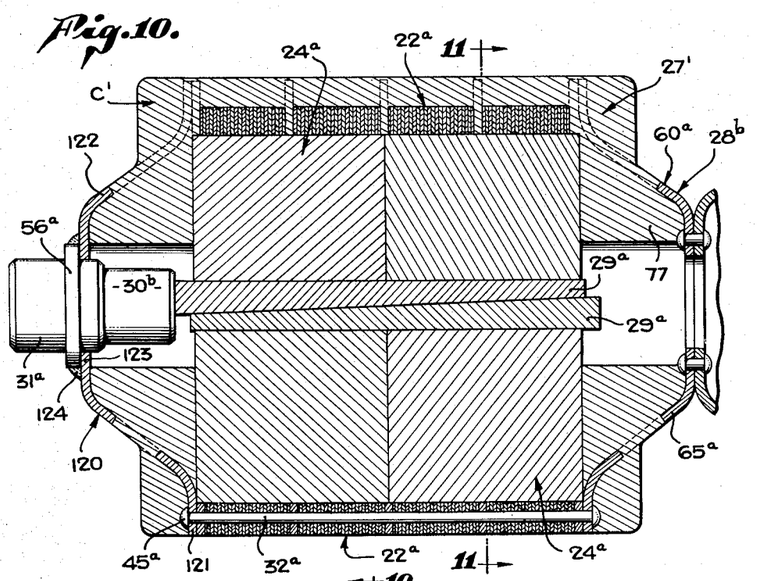
Fig. 10 is a longitudinal central sectional view of a rotor of modified form, being a view taken substantially as indicated by line 10—10 on Fig. 11.
Figure 11:
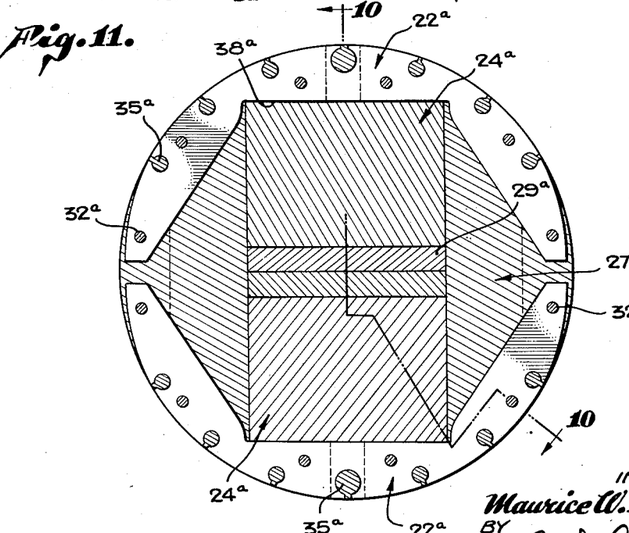
Fig. 11 is a transverse sectional view of the rotor shown in Fig. 10 taken substantially as indicated by line 11—11 on Fig. 10.

In the form of the invention illustrated in Figs. 10 and 11 of the drawings I show a somewhat modified form of rotor wherein there are only two diametrically opposed magnets 24ª in which case the annular shell or cage has but two magnetic poles 22ª. In this form of the invention the pole pieces have seats 38ª against which the magnets 24ª bear while the end portions of the pole pieces beyond the seats are considerably longer than they are in the case first described. In the form of the invention first described there is but one damper bar in each end portion of each pole piece and there are but two securing pins engaging each pole piece, whereas in the form shown in Figs. 10 and 11 there are two damper bars 35ª in each end portion of each pole piece and there is a total of six pins 32ª holding each pole piece. The coupler links employed in the modified form of the invention are similar to those above described varied somewhat in design to accommodate the fact that the structure has but two magnets and the pole pieces are of somewhat different form or design.

In the modified form of the invention the core that occupies the rectangular central opening left in the rotor by the magnets 24ª involves but two wedges 29ª which bear directly on each other without an intervening arbor. The wedges 29ª may be like oppositely disposed wedge parts seated between the magnets 24ª as clearly illustrated in the drawings. In this form of the invention the coupler 28ᵇ has an anchor section 60ª similar to the anchor section 60 above described. In the modified structure the body portion 77 is formed in the hub part 65ª of section 60ª without employing a cup or retainer 71 as above described.

At the outer end of the rotor the spindle 31ª with its adjoining flange 56ª is carried by a bracket 120 having a flange 121 secured to the outer end of the cage beneath the heads 45ª and of the pins 32ª. The bracket 120 has a conical hub portion 122 with an inner flange 123 to which the flange 56ª is secured as by welding 124. An arbor or abutment portion 30ᵇ projects inwardly from the spindle 31ª and engages the projecting end of one of the wedges 29ª to hold it positively in place as clearly shown in Fig. 10.

It will be apparent that the structure shown in Figs. 10 and 11 is somewhat simpler than that first described and it will be apparent how the body 27' of the modified structure can be cast and finished in accordance with the principles that I have outlined above.

Figure 12:
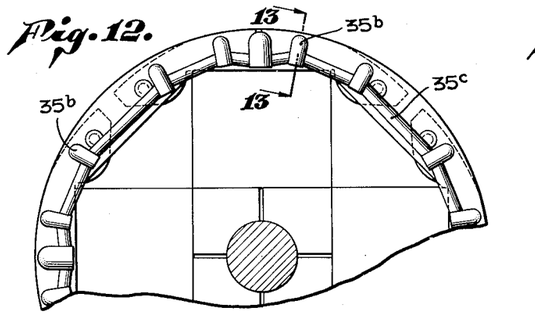
Fig. 12 is an end view of a portion of a rotor showing a modified form of damper bar.
Figure 13:
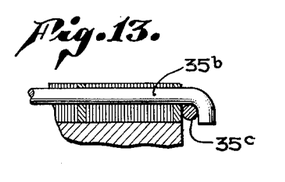
Fig. 13 is a sectional view taken on line 13—13 on Fig. 12.

In Figs. 12 and 13 I show a modified form of construction wherein the damper bars 35ᵇ instead of being part of or cast with the body are separate bars of copper or other suitable material with the projecting end portion joined to a connecting ring 35ᶜ.

Figure 14:
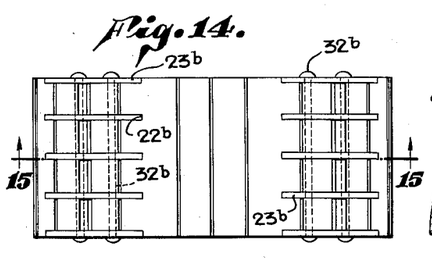
Fig. 14 is a view showing a portion of the periphery of a rotor of modified construction wherein each pole piece is a single block or body of material.
Figure 15:
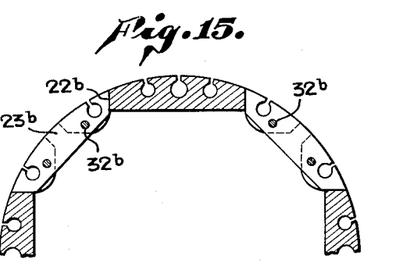
Fig. 15 is a view taken on line 15—15 on Fig. 14.

In Figs. 14 and 15 I show a pole piece construction wherein each pole piece instead of being built up of laminations is a single body or block with notches 22ᵇ in its ends to receive short links 23ᵇ. The block and links are joined by pins 32ᵇ.

Figure 16:
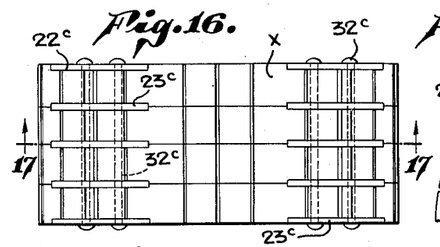
Figs. 16 and 17 are similar to Figs. 14 and 15, respectively, showing another form of construction.
Figure 17:
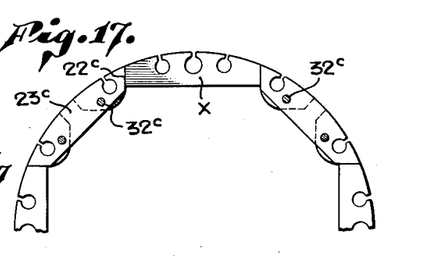

In Figs. 16 and 17 I show a pole piece construction wherein each pole piece is formed of several sections X having notches 22ᶜ in their opposing faces forming openings to receive the ends of short links 23c. The block sections and links are joined by pins 32c.

Figure 18:
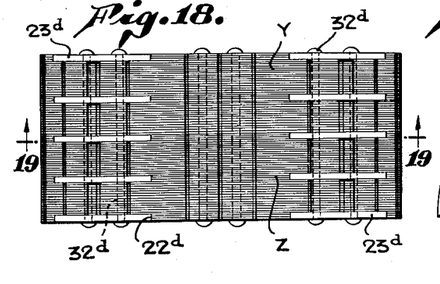
Figs. 18 and 19 are similar to Figs. 16 and 17, respectively, showing another form of construction.
Figure 19:
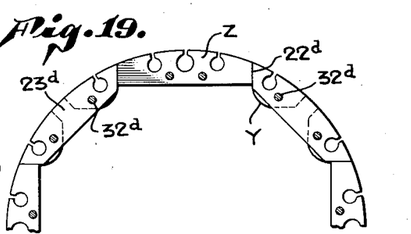

In Figs. 18 and 19 I show a laminated pole construction wherein short links 23d are used to join adjacent poles. In this case groups of large or full sized laminations Y are spaced by groups of a few small or short laminations Z leaving notches 22d at the ends of the poles to receive the short links 23d which are connected with the laminations Y by pins 32d.

Having described only typical preferred forms and application of my invention, I do not wish to be limited or restricted to the specific details herein set forth, but wish to reserve to myself any variations or modifications that may appear to those skilled in the art and fall within the scope of the following claims:

Having described my invention, I claim:

1. A rotor of the character described including, an annular cage formed of circumferentially spaced magnetic poles connected by non-magnetic couplers, magnets within the cage, and means urging the magnets outward into pressure engagement with the poles, each pole including a plurality of flat pole pieces arranged side by side and extending circumferentially of the rotor, each pole piece having a seat portion supporting a magnet.

2. A rotor of the character described including, an annular cage formed of circumferentially spaced magnetic poles connected by segmental non-magnetic couplers, magnets within the cage, and means urging the magnets outward into pressure engagement with the poles, each pole having end portions spaced from the magnet, the end portions of the poles being connected together by the couplers.

3. A rotor of the character described including, an annular cage formed of a plurality of circumferentially spaced magnetic poles connected by segmental non-magnetic couplers, each pole including groups of pole pieces separated by couplers, magnets within the cage, and means urging the magnets apart and holding the magnets in pressure engagement with the poles, each pole including flat pole pieces arranged side by side and extending circumferentially, and each pole piece having an inner edge engaged by a magnet.

4. A rotor of the character described including, an annular cage formed of circumferentially spaced magnetic poles, segmental couplers extending between the poles, and means connecting the couplers with the poles, magnets within the cage, and means urging the magnets apart and holding the magnets in pressure engagement with the poles.

5. A rotor of the character described including, an annular cage formed of circumferentially spaced magnetic poles, segmental coupler links extending between and having overlapping engagement with the poles, and pins connecting the links and the overlapping portions of the poles, magnets within the cage, and means between the magnets holding the magnets out in the cage in pressure engagement with the poles of the cage.

6. A rotor of the character described including, an annular cage formed of circumferentially spaced magnetic poles connected by non-magnetic couplers, damper bars in registering openings in the poles and couplers, magnets within the cage, and means urging the magnets outward into pressure engagement with the poles.

7. A rotor of the character described including, an annular cage formed of circumferentially spaced magnetic poles, segmental coupler links connecting and having overlapping engagement with the poles, damper bars in registering holes in overlapping portions of the poles and links, and pins connecting the links and the overlapping portions of the poles, magnets within the cage, and means holding the magnets in pressure engagement with the poles.

8. A rotor of the character described including, an annular cage having circumferentially spaced magnetic poles, magnets in the cage bearing outwardly against the poles and defining a central opening, and wedge means in said opening holding the magnets out against the poles including a plurality of wedges occupying the opening and a tapered arbor extending between the wedges.

9. A rotor of the character described including, an annular cage having circumferentially spaced magnetic poles, magnets in the cage bearing outwardly against the poles and defining a central opening, and wedge means in said opening holding the magnets out against the poles including a plurality of wedges occupying the opening and a tapered arbor extending between the wedges and having a spindle on its outer end for supporting the rotor.

10. A rotor of the character described including, an annular cage having circumferentially spaced magnetic poles, magnets in the cage bearing outwardly against the poles and defining a central opening, wedge means in said opening holding the magnets out against the poles including a plurality of wedges occupying the opening and operable lengthwise of the rotor, and a bracket attached to one end of the cage and carrying a central spindle.

11. In combination, an annular assembly of segmental magnetic poles and segmental couplers, magnets in the assembly bearing radially outward therein holding the assembly under tension, and a body embracing the assembly and magnets.

12. In combination, an annular assembly of segmental magnetic poles and segmental couplers, magnets in the assembly bearing radially outward therein holding the assembly under tension, and a body of non-magnetic material embracing the assembly and magnets.

13. In combination, an annular assembly of magnetic poles and couplers, magnets in the assembly bearing outwardly therein holding the assembly under tension, and a body of non-magnetic material cast to the assembly and magnets, the body including flanges at the ends of the rotor and axially disposed ribs extending between the assembly and magnets and coupling the flanges together.

14. In combination, an annular assembly of magnetic poles and couplers, magnets in the assembly bearing radially outward and holding the assembly under tension, and a body of non-magnetic material cast to the assembly and magnets and including bar portions in the assembly establishing damper bars in the rotor.

15. In combination, an annular assembly of segmental magnetic poles and segmental couplers, magnets in the assembly bearing radially outward and holding the assembly under tension, and a body of non-magnetic material cast to the assembly and magnets filling the interstices occurring in the structure formed by the assembly and magnets.

MAURICE W. BRAINARD.

(References on following page)

REFERENCES CITED

The following references are of record in the file of this patent:

UNITED STATES PATENTS

| Number | Name | Date |
|---|---|---|
| 1,998,709 | Dake | Apr. 23, 1935 |
| 2,255,477 | Tognola | Sept. 9, 1941 |
| 2,304,067 | Anderson | Dec. 8, 1942 |
| 2,418,980 | Morrill | Apr. 15, 1947 |
| 2,445,364 | Rankin et al. | July 20, 1948 |

FOREIGN PATENTS

| Number | Country | Date |
|---|---|---|
| 463,813 | Great Britain | Apr. 7, 1937 |